United States Patent
Alam et al.

(10) Patent No.: US 12,047,233 B2
(45) Date of Patent: *Jul. 23, 2024

(54) MOBILE APPLICATION FOR MONITORING AND CONFIGURING SECOND DEVICE

(71) Applicant: ATI Technologies ULC, Markham (CA)

(72) Inventors: Amir Alam, Markham (CA); Patrick Pak Kin Fok, Markham (CA); Le Zhang, Thornhill (CA); Ilia Blank, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,484

(22) Filed: Nov. 16, 2020

(65) Prior Publication Data

US 2021/0075673 A1 Mar. 11, 2021

Related U.S. Application Data

(63) Continuation of application No. 15/965,094, filed on Apr. 27, 2018, now Pat. No. 10,841,156.

(60) Provisional application No. 62/597,300, filed on Dec. 11, 2017.

(51) Int. Cl.
*H04L 41/0813* (2022.01)
*G06K 7/14* (2006.01)
*H04L 43/16* (2022.01)

(52) U.S. Cl.
CPC .......... *H04L 41/0813* (2013.01); *H04L 43/16* (2013.01); *G06K 7/1413* (2013.01)

(58) Field of Classification Search
CPC .... H04L 41/0813; H04L 43/16; G06K 7/1413
USPC ........................................................ 709/221
See application file for complete search history.

(56) References Cited

U.S. PATENT DOCUMENTS

| | | |
|---|---|---|
| 6,573,913 B1 | 6/2003 | Butler et al. |
| 7,209,946 B2 | 4/2007 | Dowling |
| 7,561,116 B2 | 7/2009 | Westerinen et al. |
| 8,089,423 B1 | 1/2012 | Harris |
| 8,128,503 B1 * | 3/2012 | Haot .................. H04N 21/4782 463/42 |
| 8,212,740 B1 | 7/2012 | Harris |

(Continued)

*Primary Examiner* — Tauqir Hussain
(74) *Attorney, Agent, or Firm* — Kowert, Hood, Munyon, Rankin & Goetzel, P.C.; Rory D. Rankin

(57) ABSTRACT

Systems, apparatuses, and methods for remotely adjusting performance and power parameters of a computing device are disclosed. A computing system includes a first computing device connected to a second (remote) computing device. The user uses the second computing device to monitor and adjust parameters, such as a fan speed for a GPU on a video graphics card in the first computing device, while the first computing device executes a parallel data application such as a video game. Additionally, the user uses the second computing device to manage video recorder operations. By using the second computing device to send commands to a graphics driver and a video recorder application, the first computing device's display monitor does not display a user interface during execution of the video game. No video rendering is performed by the video graphics card of the first computing device to generate and control the user interface.

20 Claims, 7 Drawing Sheets

(56) References Cited

U.S. PATENT DOCUMENTS

| | | | |
|---|---|---|---|
| 8,761,773 B2* | 6/2014 | Patini | H04W 36/22 |
| | | | 370/332 |
| 9,232,078 B1 | 1/2016 | Schentrup | |
| 9,363,311 B1* | 6/2016 | McWilliams | H04L 67/42 |
| 10,841,156 B2 | 11/2020 | Alam et al. | |
| 2005/0168399 A1 | 8/2005 | Palmquist | |
| 2006/0109197 A1 | 5/2006 | Kuwabara et al. | |
| 2007/0286123 A1* | 12/2007 | Semper | H04W 36/0011 |
| | | | 370/331 |
| 2009/0172577 A1 | 7/2009 | Kim et al. | |
| 2010/0225664 A1 | 9/2010 | Ogasawara | |
| 2010/0321275 A1 | 12/2010 | Hinckley et al. | |
| 2010/0328447 A1 | 12/2010 | Watson | |
| 2012/0092234 A1 | 4/2012 | Trooskin-Zoller et al. | |
| 2012/0264397 A1* | 10/2012 | Meredith | H04W 76/10 |
| | | | 455/410 |
| 2012/0314899 A1 | 12/2012 | Cohen et al. | |
| 2013/0155096 A1 | 6/2013 | Legair-Bradley | |
| 2013/0262687 A1* | 10/2013 | Avery | H04L 63/18 |
| | | | 709/227 |
| 2014/0280981 A1* | 9/2014 | Singhal | H04L 67/18 |
| | | | 709/227 |
| 2014/0302915 A1* | 10/2014 | Lyons | G07F 17/3237 |
| | | | 463/25 |
| 2015/0019715 A1* | 1/2015 | Ronen | H04W 24/10 |
| | | | 709/224 |
| 2015/0127714 A1* | 5/2015 | Ivashyn | G06F 21/42 |
| | | | 709/203 |
| 2016/0098334 A1* | 4/2016 | Hariharakrishnan | |
| | | | G06F 11/3466 |
| | | | 702/186 |
| 2016/0127476 A1* | 5/2016 | Kominac | G06F 9/452 |
| | | | 709/203 |
| 2017/0083926 A1* | 3/2017 | Karcher | G06Q 30/0201 |
| 2017/0102979 A1* | 4/2017 | Ramirez | G06F 11/079 |
| 2017/0244676 A1* | 8/2017 | Edwards | H04L 63/08 |
| 2017/0251347 A1* | 8/2017 | Mehta | H04W 4/90 |
| 2017/0289596 A1* | 10/2017 | Krasadakis | H04W 4/021 |
| 2017/0374115 A1* | 12/2017 | Sinclair | H04L 65/605 |
| 2018/0006886 A1* | 1/2018 | Dhanakshirur | H04L 43/0817 |
| 2018/0075222 A1* | 3/2018 | Chen | A61B 5/746 |
| 2018/0077124 A1* | 3/2018 | Ramoutar | H04L 63/067 |
| 2018/0084015 A1* | 3/2018 | Gupta | H04L 12/1822 |
| 2018/0091326 A1* | 3/2018 | McLaughlin | H04L 67/22 |
| 2018/0121087 A1* | 5/2018 | Schmitz | G06F 11/3037 |
| 2018/0131578 A1* | 5/2018 | Cui | H04L 47/70 |
| 2018/0131579 A1* | 5/2018 | Jacobs | H04L 41/082 |
| 2018/0157685 A1* | 6/2018 | Flerl | G06F 11/3051 |
| 2018/0232352 A1* | 8/2018 | Fulford | G06F 16/9577 |
| 2018/0246998 A1* | 8/2018 | Ronen | G06F 11/3452 |
| 2018/0331916 A1* | 11/2018 | Damaggio | G06F 9/542 |
| 2019/0098445 A1* | 3/2019 | Hu | H04W 12/50 |
| 2021/0279677 A1* | 9/2021 | Beasley | G06Q 10/0832 |

* cited by examiner

MOBILE APPLICATION FOR MONITORING AND CONFIGURING SECOND DEVICE

CROSS REFERENCE TO RELATED APPLICATIONS

This application is a continuation of U.S. patent application Ser. No. 15/965,094, entitled "MOBILE APPLICATION FOR MONITORING AND CONFIGURING SECOND DEVICE", filed Apr. 27, 2018, which claims priority to U.S. Provisional Patent Application Ser. No. 62/597,300 entitled "Mobile Application For Monitoring And Configuring Second Device," filed Dec. 11, 2017, the entirety of which is incorporated herein by reference.

BACKGROUND

Description of the Related Art

In computing systems, various types of applications perform functions that are able to better exploit parallel processing and shared memory than other applications. Some examples of such applications include entertainment applications such as video game applications and movie applications. Other examples of such applications are machine learning applications and some business, scientific, medical and other applications. While some architectures may include more than one processing unit (e.g., CPU, GPU, etc.) or processing core, and one or two additional processing units or cores coupled to a memory to provide a sufficient level of parallelism to provide a desired level of performance. In addition, peripheral cards, such as video graphics cards, are used to increase parallelism and performance.

When users (gamers) play video games on a computing device, the users often play the game in an exclusive full screen mode. Consequently, the user cannot access various system and/or application settings, such as desktop graphics configuration data, without leaving the game or entering a windowed state. Therefore, the user is unable to monitor the state of the graphics processor (e.g., its temperature or clock speed) or adjust graphics settings such as increasing GPU fan speed.

The current solution is to display graphics information and a user interface inside the game being displayed on one of a variety of display monitors. The user interface allows the user to configure components of the computing device. However, this in-game user interface covers a portion of the game which worsens the user's gaming experience. The user interface also slows down the graphics rendering as graphics resources are used to generate and control the in-game user interface (UI).

In view of the above, methods and systems for remotely adjusting performance and power parameters of a computing device are desired.

BRIEF DESCRIPTION OF THE DRAWINGS

The advantages of the methods and mechanisms described herein may be better understood by referring to the following description in conjunction with the accompanying drawings, in which.

Figure 1:
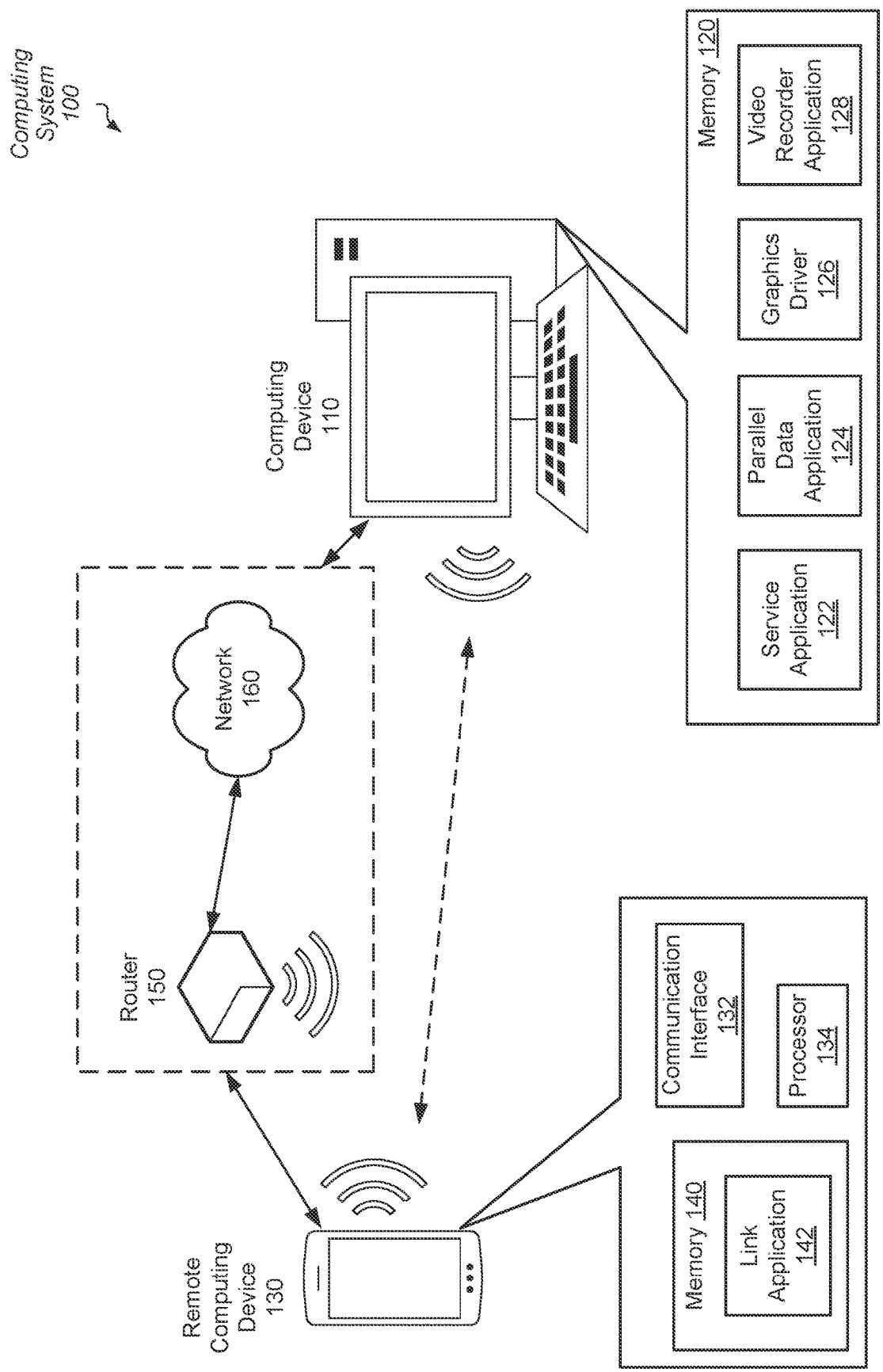
FIG. 1 is a block diagram of one implementation of a computing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for remotely adjusting performance and power parameters of a computing device are disclosed. In various implementations, a computing system includes a first computing device and a second (remote) computing device. The first computing device is connected to the second computing device through a wired connection or a wireless connection. In an implementation, the first computing device is a desktop computer and the second (remote) computing device is a smartphone. In one implementation, a same user owns, or has permissible access to, each of first and second computing devices.

In some implementations, the first computing device includes a graphics driver for allowing the operating system, the user and applications to access and adjust parameters of the graphics hardware of the first computing device. The video graphics card and the display monitor are examples of the graphics hardware. In some implementations, the graphics driver provides the user the capability of adjusting the screen resolution, the frame rate, the fan speed of a GPU, the video memory utilization, and so forth. In an implementation, the first computing device also includes a video recorder application for providing the user the capability of recording the audio/video (A/V) content produced by an application executing on the first computing device, saving screenshots of video content provided on the display monitor, and turning on and off the microphone.

In an implementation, the user uses the second (remote) computing device to monitor and adjust operational characteristic parameters, such as a fan speed for a GPU on a video graphics card in the first computing device, while the first computing device executes a video game application. By using the second computing device to send commands to the graphics driver and the video recorder application, the display monitor of the first computing device does not display a user interface during execution of the video game. Additionally, the user uses the second (remote) computing device to manage video recorder operations. By using remote the second (remote) computing device, no user interface is displayed on the display monitor of the first computing device during execution of the video game (or other) application and the second computing device can affect operational characteristics of the first computing device while the first computing device continues to execute the application. In various implementations, these operational characteristics include at least one of screen resolution, frame rate, fan speed of a CPU and/or GPU, video memory utilization, processor frequency, and voltage. Accordingly, no video rendering is performed by graphics resources on the video graphics card of the first computing device to generate and control the user interface.

Turning now to FIG. 1, a generalized block diagram of one implementation of a computing system 100 is shown. As shown, the computing system 100 includes computing devices 110 and 130. In various implementations, computing device 110 includes a communication interface 132, a processor 134 and memory 140. Although not shown, computing device 110 includes one or more processors and a communication interface. Computing device 110 also includes memory 120.

In the illustrated implementation, computing system 100 also includes router 150, which is used to connect each of computing devices 110 and 130 to network 160. In an implementation, network 160 includes multiple switches, routers, cables, wireless transmitters and the Internet for transferring messages and data. In some implementations, computing device 110 is connected to remote computing device 130 through a cable connection such as a Universal Serial Bus (USB) serial bus interface for connecting devices or an Ethernet cable connection. Other varieties of serial and parallel ports are used for cable connections in other implementations. In yet other implementations, a wireless connection is used for communication between computing devices 110 and 130. In such an implementation, router 150 is a Wi-Fi router. In various implementations, communication interface 132 is used by computing device 130 to support one or more communication protocols in order to transfer requests and responses to and from at least computing device 110 via network 160.

In some implementations, computing device 110 is a desktop computer. In other implementations, computing device 110 is a tablet computer, a gaming console, a laptop computer, or other. In some implementations, remote computing device 130 is a mobile device such as a smartphone, a tablet computer, a laptop computer, a smartwatch, or other. In an implementation, a same user owns, or has permissible access to, each of computing devices 110 and 130.

In various implementations, computing device 110 is connected to a display device such as a one of a variety of display monitors. In an implementation, computing device 110 includes a video graphics card with one or more fans for cooling the components of the video graphics card. Additionally, in some implementations, computing device 110 is connected to one or more peripheral devices such as a keyboard, a joystick or a gaming controller, a mouse, a headset, a microphone in the headset or an external microphone, and speakers separate from the headset.

In an implementation, computing device 110 includes a general-purpose central processing unit (CPU) and a graphics processing unit (GPU). In some implementations, the CPU and the GPU are included in an accelerated processing unit (APU). In an implementation, computing device 110 includes a multimedia engine or other dedicated audio/video processing engine in addition to the CPU and the GPU. For example, in an implementation, computing device 110 includes a video graphics card with one or more dedicated GPUs and corresponding fans. In some implementations, remote computing device 130 includes one or more of the hardware components of computing device 110. For example, processor 134 is one of a CPU, a GPU, a multimedia engine, and so forth. Although a single processor 134 is shown, in some implementations, computing device 130 includes multiple processors such as one or more of the processor types described earlier.

Each of the CPU and the GPU used by one or more of computing devices 110 and 130 (e.g., processor 134) includes microarchitectures with one or more processing units, each with one or more processor cores. At least the GPU and any multimedia engine includes multiple instantiated arithmetic logic units (ALUs) and other data processing logic connected to local data stores to provide a sufficient level of parallelism for a desired level of performance. For example, various types of applications perform functions that are able to better exploit parallel processing and shared memory than other applications. Some examples of such applications include entertainment applications such a video game applications. Other examples are machine learning applications as well as some business, scientific, and medical applications, and other entertainment applications such movies.

In various implementations, computing devices 110 and 130 use a multi-level cache memory subsystem. A processor core determines a given memory access request misses within the cache memory subsystem and sends the memory access request to system memory via memory controllers. Memories 120 and 140 represent system memory for computing devices 110 and 130, respectively. Memories 120 and 140 include any of a variety of random access memories (RAMs). In some implementations, memories 120 and 140 store program instructions and program data and corresponding metadata in synchronous RAMs (SRAMs). In other implementations, memories 120 and 140 store instructions and data and corresponding metadata in one of a variety of dynamic RAMs (DRAMs). For example, depending on the implementation, memories 120 and 140 store data in traditional DRAM or in multiple three-dimensional (3D) memory dies stacked on one another.

In various implementations, memories 120 and 140 are filled with data from disk memory (not shown). In an implementation, disk memory provides a non-volatile, secondary storage of data. In some implementations, disk memories for computing devices 110 and 130 include one or more of hard disk drives (HDDs), solid-state disks (SSDs) and/or other varieties of non-volatile secondary data storage. As shown, memory 120 includes service application 122, parallel data application 124, graphics driver 126 and video recorder application 128. Memory 120 also includes an operating system, application data, and other applications and drivers, which are not shown for ease of illustration.

Graphics driver 126 allows the operating system, the user and applications, such as parallel data application 124, to access and adjust parameters of the graphics hardware of computing device 110. The video graphics card and the display monitor are examples of the graphics hardware. In some implementations, graphics driver 126 provides the user the capability of adjusting the screen resolution, the frame rate, the fan speed of a GPU, the video memory utilization, processor frequency, operating voltage, and so forth.

Video recorder application 128 also accesses the graphics hardware of computing device 110, but video recorder application 128 provides the user the capability of recording the audio/video (A/V) content produced by executing parallel data application 124. In addition to recording A/V content, in some implementations, video recorder application 128 allows the user to save screenshots of video content provided on the display monitor, turn on and off the microphone, generate a graphic thumbnail indicating recorded video content, and stream A/V content to other users through the network 160.

In an implementation, parallel data application 124 is one example of an application, which performs functions that are able to better exploit parallel processing and shared memory than other applications. In some implementations, parallel data application 124 is a video game application. In an implementation, the user uses remote computing device 130 to monitor and adjust parameters, such as a fan speed for a GPU on a video graphics card in computing device 110, while computing device 110 executes parallel data application 124. By using remote computing device 130 to send commands to graphics driver 126 and video recorder application 128, the display monitor of computing device 110 does not display a graphics information and configuration user interface during execution of parallel data application 124 such as a video game application.

Without using remote computing device 130, the user interface provided on the display monitor of computing device 110 covers a portion of the video game displayed on the display monitor during execution of parallel data application 124. Displaying the user interface also slows down the video rendering as graphics resources on the video graphics card are used to generate and control the in-game user interface. To use remote computing device 130 instead as the user interface, each of link application 142 on memory 140 and service application 122 on memory 120 are used.

In some implementations, link application 142 is a mobile client application (sometimes referred to as an "app") comprising program code executable by a processor in the device 130 that allows remote computing device 130 to access, or otherwise affect, certain functionalities of one or more applications executed on computing device 110 such as graphics driver 126 and video recorder application 128. In an implementation, link application 142 is downloaded from network 160, such as the Internet, and stored on remote computing device 130. In an implementation, service application 122 is also downloaded from network 160 and stored on computing device 110. In another implementation, service application 122 is pre-installed on computing device 110 at a manufacturing site.

In one implementation, service application 122 and link application 142 communicate through a wired connection such as an Ethernet connection, a USB connection, or other. In another implementation, service application 122 and link application 142 communicate through a wireless connection through router 150. In various implementations, each of computing devices 110 and 130 includes one or more communication interfaces configured to communicate with other devices. In some implementations, the communication interfaces is a network interface(s) (including a network interface controller or "NIC") configured to communicate with other devices. In various implementations, this interface is configured to support wired connections, wireless connections, or both. For example, in some implementations the network interface is configured to both monitor network traffic and broadcast requests to router 150, which is a Wi-Fi router. In an implementation, the NIC passes detected requests to a processing unit. The requests include unique identifiers of source devices communicating on the network. In some implementations, the unique identifiers include one or more of a media access control (MAC) address, an Internet Protocol (IP) address, a device host name, a server-generated token, and a randomly generated string such as a global unique identifier (GUID). In other implementations, the unique identifiers include any combination of these values and one or more of a variety of other values.

Service application 122 manages the network communication between link application 142 and one or more of graphics driver 126 and video recorder application 128. Service application 122 provides a communication interface layer for link application 142 to remotely access data stored on computing device 110 and invoke behavior on one or more of graphics driver 126 and video recorder application 128. Examples of the behavior for graphics driver 126 are one or more of adjusting a fan speed for a GPU, adjusting an operating clock frequency for the GPU, adjusting a frames per second processing parameter for a video graphics card, adjusting a memory utilization, and so forth.

Examples of the behavior for video recorder application 128 are starting and stopping recording of A/V content, saving screenshots of video content provided on the display monitor, turning on and off the microphone, generating a graphic thumbnail indicating recorded video content, and so forth. By using remote computing device 130, link application 142 and service application 122, no user interface is displayed on the display monitor of computing device 110 during execution of parallel data application 124. Accordingly, no video rendering is performed by graphics resources on the video graphics card of computing device 110 to generate and control the user interface.

Figure 2:
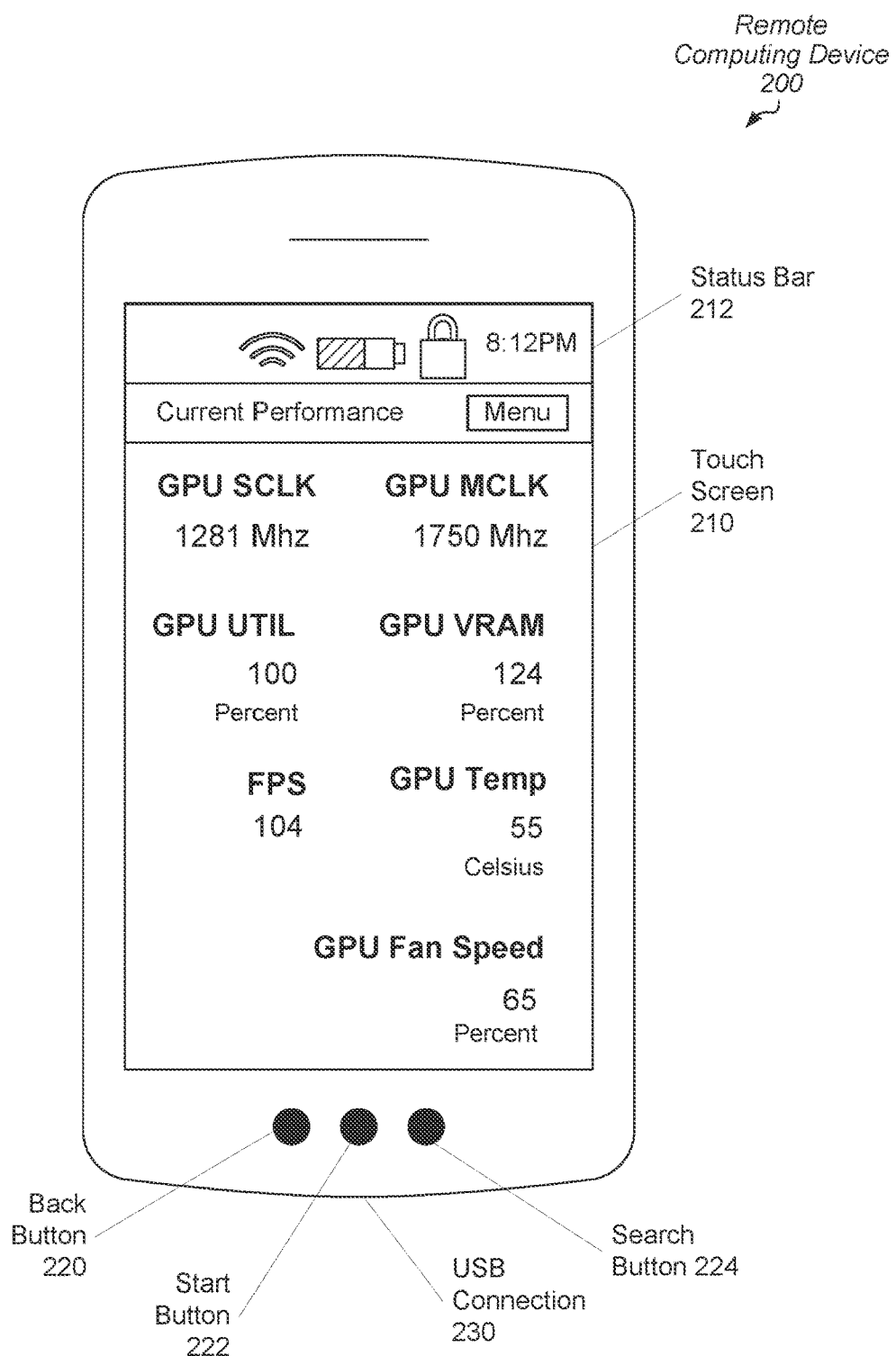
FIG. 2 is a block diagram of one implementation of a remote computing device.

Referring now to FIG. 2, a generalized block of one implementation of a remote computing device 200 is shown. As shown, remote computing device 200 is a smartphone. However, in other implementations, the remote computing device is a smartwatch, a tablet computer, a laptop computer or other. In the illustrated implementation, remote computing device 200 includes a touch screen 210 with a status bar 212. Remote computing device 200 also includes controls for managing the content displayed on the touch screen 210. Examples are the back button 220, the start button 222 and the search button 224.

Depressing the start button 222 causes remote computing device 200 to display a home screen on touch screen 210. Depressing the back button 222 causes remote computing device 200 to display a screen previously shown prior to the current screen on touch screen 210. Depressing the search button 224 causes remote computing device 200 to display a screen for the user to input search criteria. Although remote computing device 200 provides a wireless connection, such as a Wi Fi connection, remote computing device 200 also provides a wired connection through the USB connection 230. For other types of remote computing devices, such as a tablet computer or a laptop computer, an Ethernet connection is provided for wired connection.

In the illustrated implementation, status bar 212 includes an indication of a cellular signal strength, an indication of remaining battery supply, an indication of a screen lock, and an indication of a current time. In other implementations, other indications are shown in status bar 212 such as a current date, an available wireless technology, such as a Bluetooth connection, an on/off status of a do not disturb mode, and so forth.

As shown, touch screen 210 displays a screen for adjusting one or more selected parameters for a video graphics card in another computing device. As shown, the parameters include a processing engine clock (SCLK) for a GPU performing video rendering on the other computing device. In an implementation, the GPU is on a video graphics card of the other computing device. The parameters also include a memory clock (MCLK) for the GPU, a measured utilization of the GPU, a utilization of video memory (VRAM) for the GPU, a frame rate or frames per second (FPS) measurement, a temperature of the GPU, and a fan speed for the GPU. Other examples of the parameters, which are shown on touch screen 210, after the user performs a scrolling action, are a CPU utilization, an operating clock frequency of the CPU and a utilization of system memory.

Yet another example of the parameters to be shown on touch screen 210 is a sampling interval. In an implementation, remote computing device 200 executes a mobile client application similar to link application 142 (of FIG. 1) and the computing device executing a parallel data application, such as a video game application, also executes a mobile server application similar to service application 122 (of FIG. 1). At a specified sampling interval, the mobile server application running on the computing device polls or queries selected parameters and sends updates to the mobile client application running on the remote computing device 200. In an implementation, a wireless connection is used for transferring commands and data between remote computing device 200 and the other computing device such as a desktop computer running the parallel data application.

Examples of the sampling interval are one second, two seconds, five seconds and ten seconds. However, in other implementations, any other time period is used. If the user does not specify a sampling interval, then a default sampling interval is used by the mobile server application running on the other computing device. In an implementation, the user identifies on the touch screen 210 a parameter to adjust and selects it by touching an indication of the parameter on the touch screen 210. In an implementation, another menu is shown on touch screen 210 where the user inputs a new value for the selected parameter.

Upon entering a new value, the mobile client application running on remote computing device 200 sends a command to the mobile server application via the wired or wireless connection with an indication of the new value. Therefore, no user interface is displayed on the display monitor of the other computing device during execution of the parallel data application such as a video game application. Additionally, no video rendering is performed by graphics resources on the video graphics card of the other computing device to generate and control the user interface. Instead, the user interface is provided on touch screen 210 of remote computing device 200.

Figure 3:
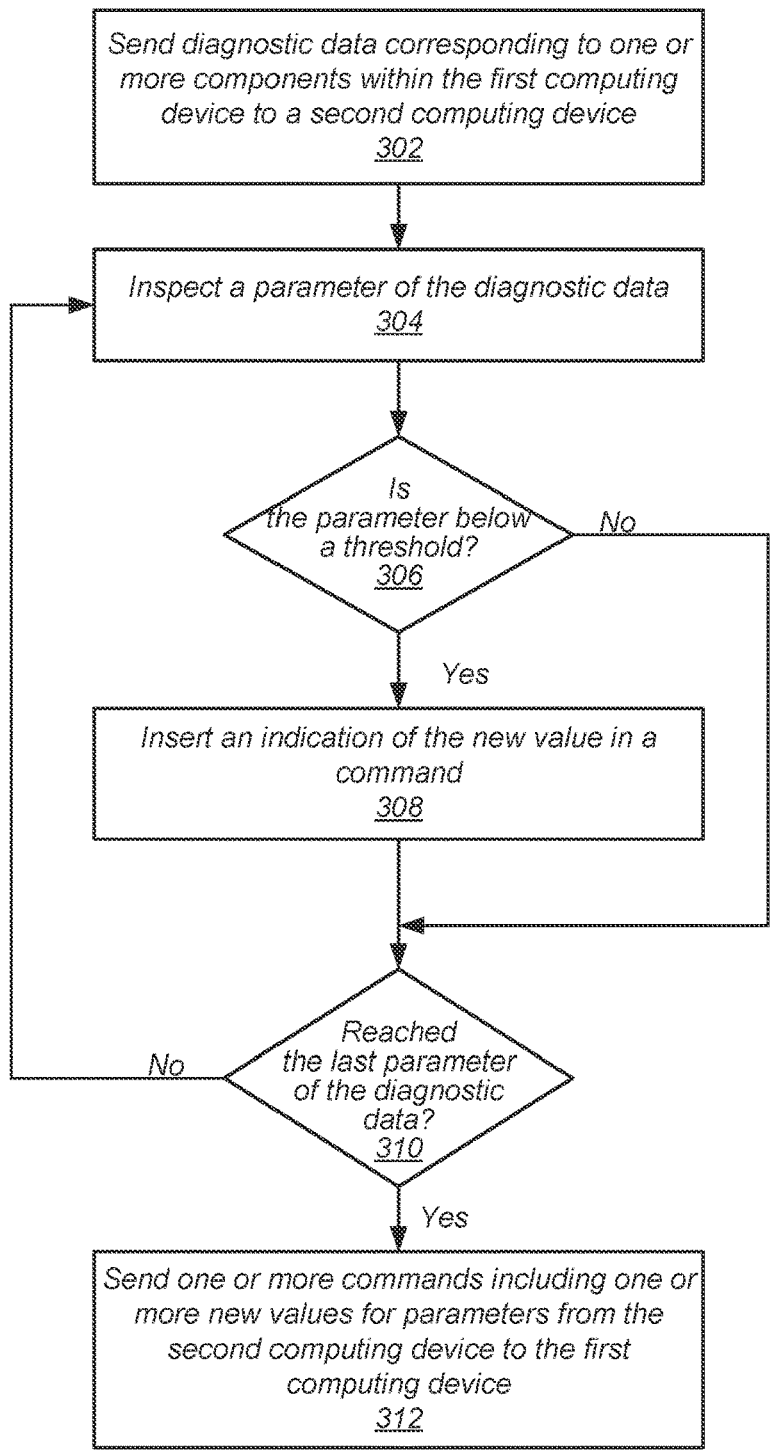
FIG. 3 is a flow diagram of one implementation of a method for remotely adjusting performance and power parameters of a computing device.

Referring now to FIG. 3, one implementation of a method 300 for remotely adjusting performance and power parameters of a computing device is shown. For purposes of discussion, the steps in this implementation (as well as in FIGS. 5 and 7) are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 300.

One or more software applications are processed on a first computing device. Therefore, one or more processors on the first computing device executes program code corresponding to the one or more software applications. Examples of the first computing device are a desktop computer, a tablet computer, a gaming console, a laptop computer, or other. Diagnostic data corresponding to one or more components within the first computing device are sent to a second computing device (block 302). In various implementations, the diagnostic data includes data indicative of operational characteristics of the second computing device. In an implementation, the second computing device is a remote computing device such as a smartphone, a tablet computer, a laptop computer, a smartwatch, or other.

In various implementations, the remote computing device executes a mobile client application, which communicates with a mobile server application executing on the first computing device. Communication uses either a wired connection, such as an Ethernet or USB connection, or a wireless connection such as a Wi Fi connection. In some implementations, the user opens a performance monitoring tab on the remote computing device. By doing so, the mobile client application on the remote computing device initiates a diagnostic data monitoring session by sending a request to the mobile server application on the first computing device. In an implementation, the request includes configuration data identifying parameters to monitor and a sampling interval for querying values of the identified parameters. If parameters are not identified by the user, then a default list of parameters is used.

In various implementations, the diagnostic data includes operational characteristic parameters described earlier such as one or more of a processing engine clock frequency for a GPU performing video rendering on the first computing device, a memory clock frequency for the GPU, a measured utilization of the GPU, a utilization of video memory for the GPU, a frame rate or frames per second (FPS) measurement, a temperature of the GPU, a fan speed for the GPU, a CPU utilization for the first computing device, an operating clock frequency of the CPU and a utilization of system memory. The mobile server application on the first computing device queries one or more identified parameters or a default list of parameters after the specified sampling interval has elapsed. The queried parameters are sent on a wired or wireless connection from the first computing device to the remote computing device.

At the remote computing device, a parameter of the diagnostic data is identified in the diagnostic data and inspected (block 304). For example, in one implementation, a user sets ones or more thresholds for one or more parameters. For example, the user enters one or more values into an interface of the mobile client application to be used as the one or more thresholds. In another implementation, one or more default thresholds are used by the mobile client application. In various implementations, the inspected parameters are compared to corresponding thresholds. In yet another implementation, the user inspects diagnostic data presented on a screen of the second (remote) computing device and compares the inspected parameters to thresholds selected by the user.

If the parameter is below a corresponding threshold ("yes" branch of the conditional block 306), then the processor executing the application on the mobile or remote device provides an input indicating a new value and an indication of the new value is inserted in a command (block 308). Alternatively, rather than the processor on the mobile computing device automatically determining whether the parameter is below a corresponding threshold, in another implementation the user decides the parameter should have a new value. The second (remote) computing device prepares commands to send to the mobile server via the interface based on the comparison results and/or user input. As used herein, referring to a parameter as being "below" a threshold may indicate an operational characteristic of the computing device is lower than some value or higher than some value. For example, if a fan speed is lower than a desired value, then the fan speed may be considered below the desired fan speed. Alternatively, if the fan speed is higher than a desired value, then the fan speed may be considered below a desired efficiency or power consumption. As an alternative, a determination may be made as to whether a given parameter is "above" a threshold. These and other various implementations are possible and are contemplated.

If the last parameter of the diagnostic data is not reached ("no" branch of the conditional block 310), then control flow of method 300 returns to block 304 where a next parameter of the diagnostic data is inspected. In other implementations, the user selects a menu option indicating adjustments of one or more parameters should be performed at or near the current time. If the last parameter of the diagnostic data is reached ("yes" branch of the conditional block 310), then one or more commands including one or more new values for parameters are sent from the second (remote) computing device to the first computing device (block 312). For example, in an implementation, the mobile client application sends the commands with the new values to the mobile server application through a wireless connection such as a Wi Fi connection.

In some implementations, the mobile client application running on the second (remote) computing device sends a "keep alive" message to the mobile server application running on the first computing device. This message indicates to the mobile server application to continue querying parameters and sending updated values to the mobile client application on the second (remote) computing device. In an implementation, the second (remote) computing device sends this message after a particular number of received parameter updates, after a specified time interval, or other. In an implementation, when the mobile server application on the first computing device detects that the mobile client application on the second (remote) computing device is closed, has sent a user command indicating ending the session, or otherwise has lost connectivity, the mobile server application terminates the querying and updating session.

Figure 4:
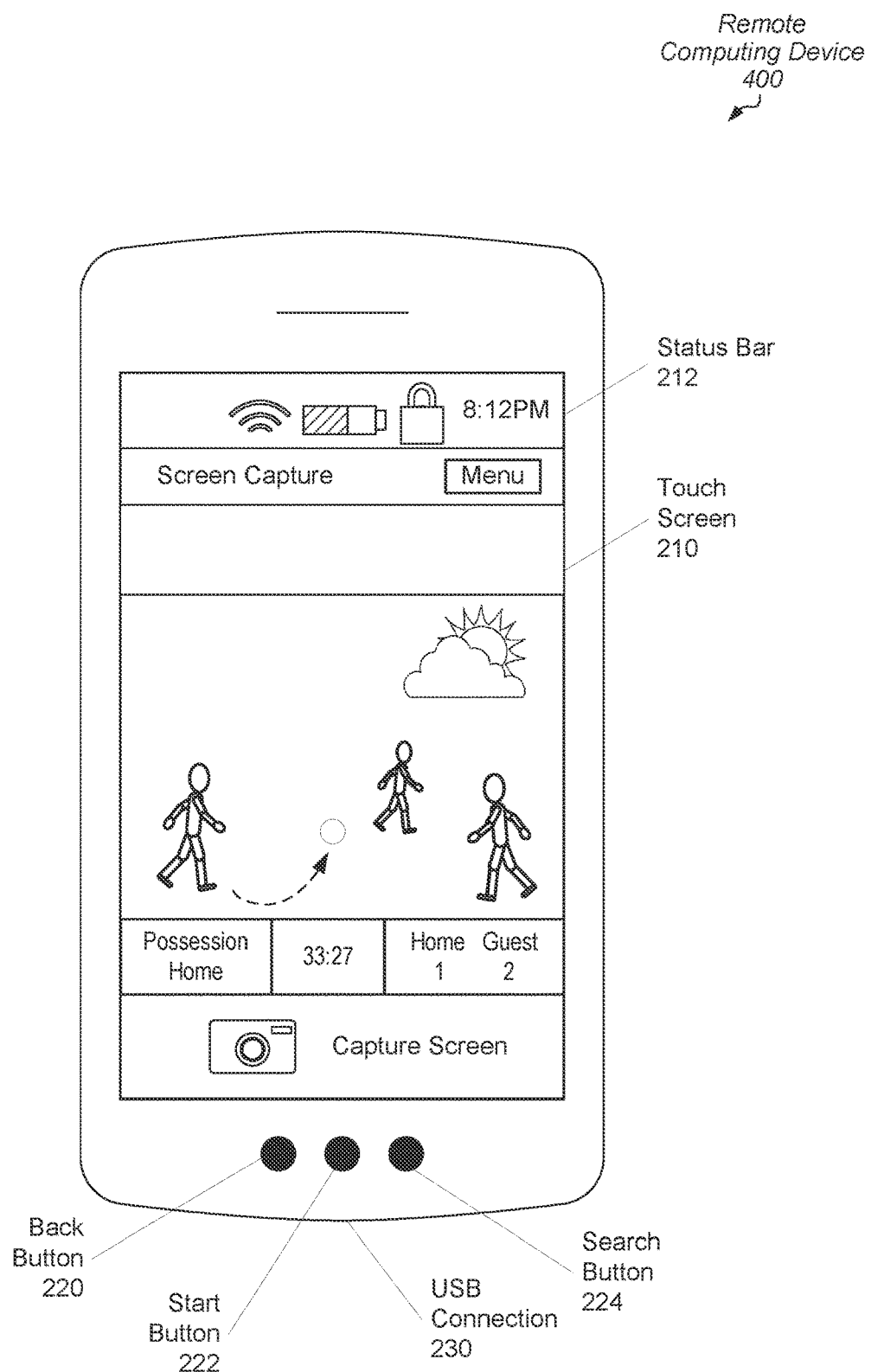
FIG. 4 is a block diagram of another implementation of a remote computing device.

Referring now to FIG. 4, a generalized block of one implementation of a remote computing device 400 is shown. As shown, remote computing device 400 is a smartphone. However, in other implementations, the remote computing device 400 is a smartwatch, a tablet computer, a laptop computer or other. Components described earlier are numbered identically. As shown, touch screen 210 displays a screen, which is a screenshot of a screen on another computing device executing a parallel data application such as a video game application.

In an implementation, the image displayed on touch screen 210 is a screenshot of a simulated sports game such as soccer. In other implementations, the screenshot includes an image from another simulated sports game such as football, basketball, tennis, snow skiing and so forth. In other implementations, the screenshot includes an image from a variety of other video games such as space wars games, military simulated games, automobile driving games, flight simulation games, movie-themed games, medieval time period fantasy games, and so on. In some implementations, controls for a video recorder application are also shown on touch screen 210. In other implementations, the controls are displayed after the user depresses the menu button on touch screen 210.

As described earlier, examples of the controls for video recorder application are starting and stopping recording of A/V content, saving screenshots of video content provided on the display monitor, turning on and off the microphone, generating a graphic thumbnail indicating recorded video content, and so forth. When the user selects a video recorder operation on the touch screen 210, the mobile client application running on remote computing device 400 sends a command to a mobile server application executing on the other computing device via a wired or a wireless connection with an indication of the operation. Therefore, no user interface is displayed on the display monitor of the other computing device during execution of the parallel data application such as a video game application. Additionally, no video rendering is performed by graphics resources on the video graphics card of the other computing device to generate and control the user interface. Instead, the user interface is provided on touch screen 210 of remote computing device 400.

Figure 5:
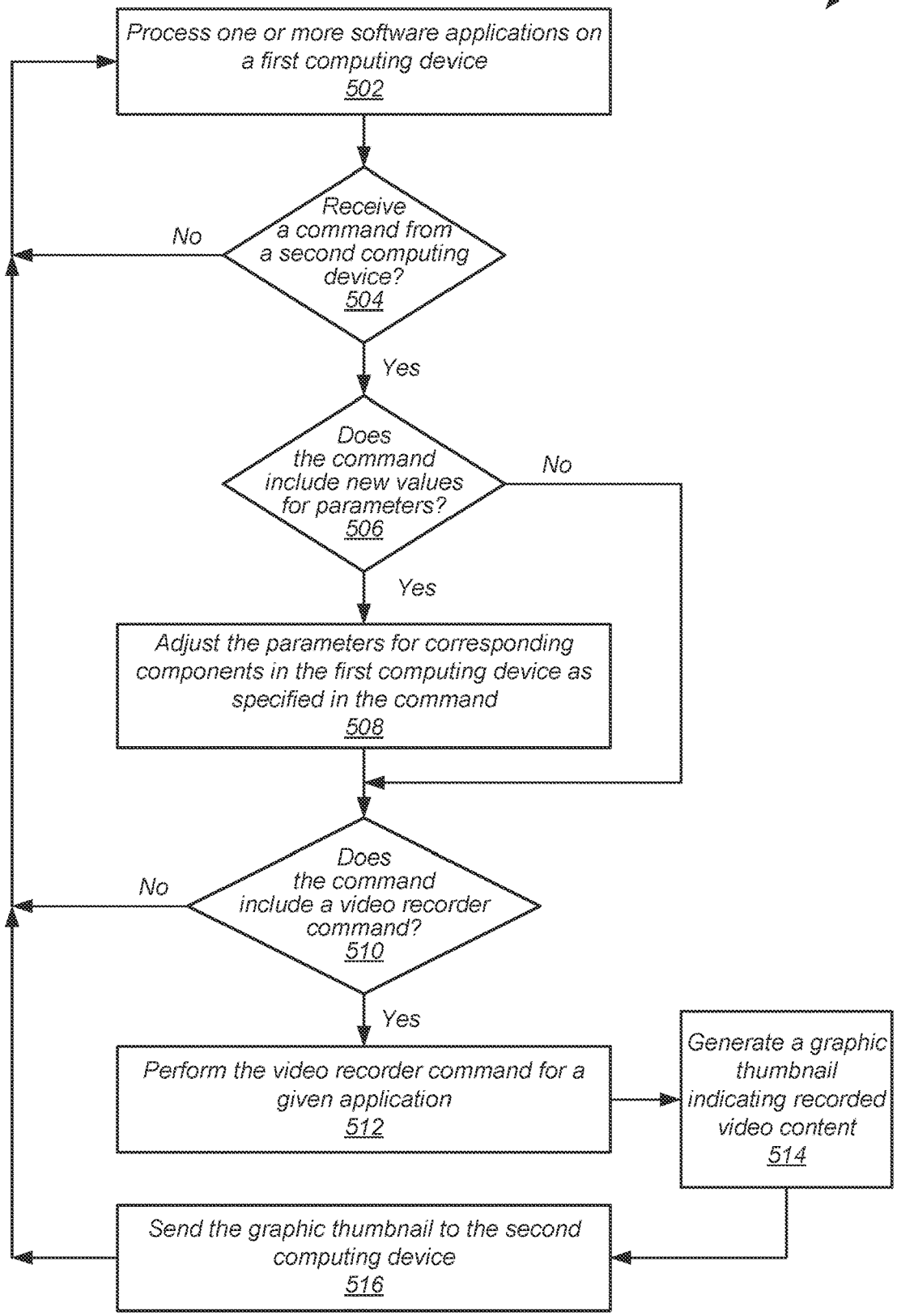
FIG. 5 is a flow diagram of one implementation of a method for remotely controlling a computing.

Referring now to FIG. 5, one implementation of a method 500 for remotely controlling a computing device is shown. One or more software applications are processed on a first computing device (block 502). Therefore, one or more processors on the first computing device execute program code corresponding to the one or more software applications. In various implementations, the first computing device executes a mobile server application in addition to other software applications such as a video game application or other parallel data application. The mobile service application communicates with a mobile client application executing on a second computing device through a wired or wireless connection.

If a command is received by the mobile service application on the first computing device from the mobile client application on the second computing device ("yes" branch of the conditional block 504), and the command includes new values for parameters ("yes" branch of the conditional block 506), then the parameters for corresponding components in the first computing device are adjusted as specified in the command (block 508). As described earlier, based on the received command, the first computing device adjusts one or more of the screen resolution of a connected display monitor, the frame rate, the fan speed for a GPU, the video memory utilization, an operating clock frequency for the GPU, and so on.

If the received command includes a video recorder command ("yes" branch of the conditional block 510), then the video recorder command is performed for a given application (block 512). As described earlier, based on the received command, the first computing device starts and/or stops recording of A/V content, saves screenshots of video content provided on the display monitor, turns on or off a microphone, changes a position of a camera or viewpoint in a multimedia application such as a video game application, and so forth.

In an implementation, the mobile server application pushes updates to the set of available video recorder functionalities to the mobile client application as the functionalities change. The mobile client application on the second (remote) computing device updates and displays these changes automatically via a user interface without requiring the user to trigger a refresh. The first computing device generates a graphic thumbnail indicating recorded video content is recorded (block 514). The graphic thumbnail is sent to the second computing device (block 516). In an implementation, the user browses thumbnails for A/V content to send to other users via the Internet or to determine which A/V content to replay.

Figure 6:
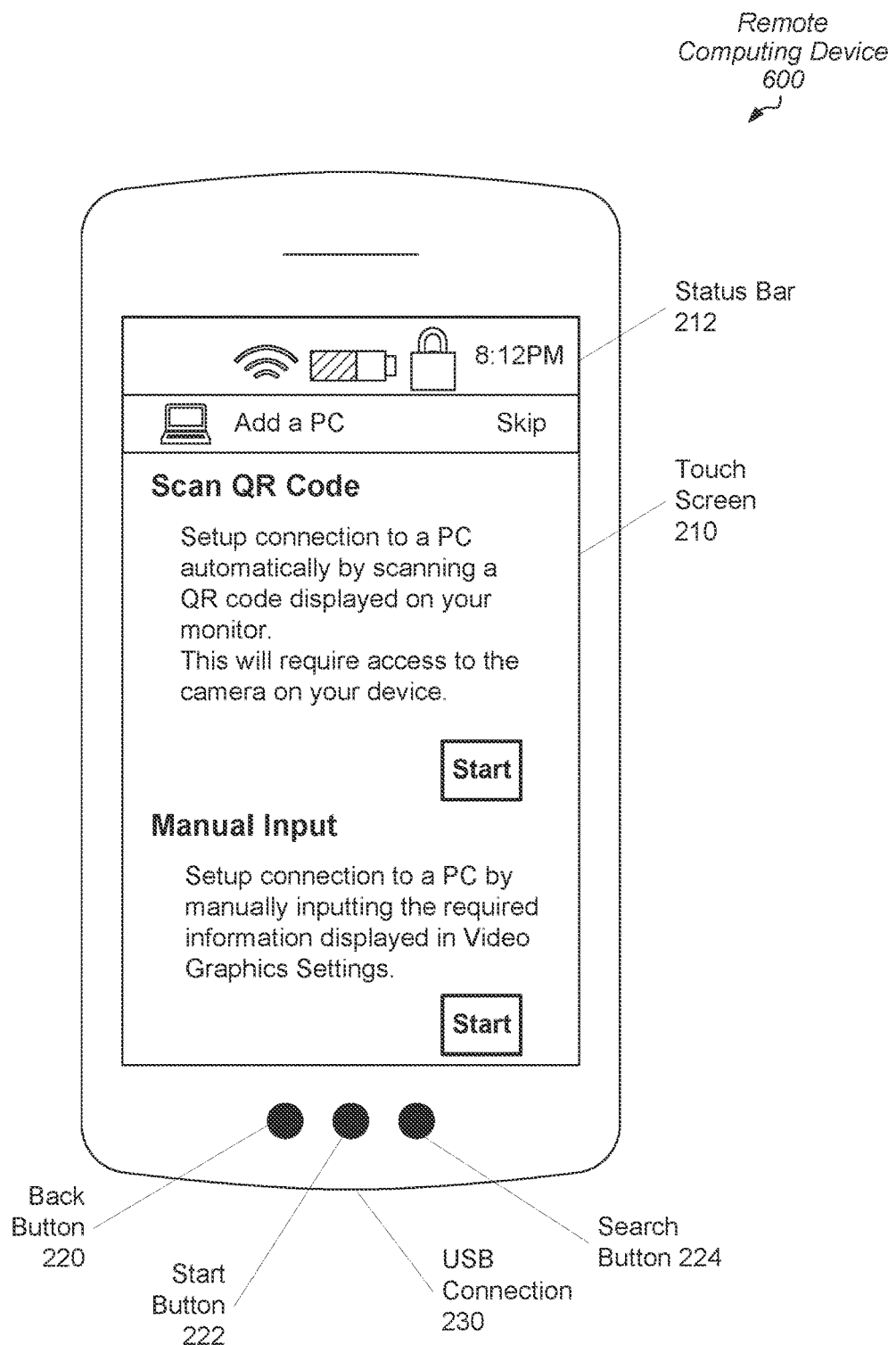
FIG. 6 is a block diagram of another implementation of a remote computing device.

Referring now to FIG. 6, a generalized block of one implementation of a remote computing device 600 is shown. Similar to remote computing devices 200 and 400, remote computing device 600 is shown as a smartphone. However, in other implementations, remote computing device 600 is a smartwatch, a tablet computer, a laptop computer or other. Components described earlier are numbered identically. As shown, touch screen 210 displays a screen for initiating connection between remote computing device 600 and another computing device.

In an implementation, the user selects a mobile client-server connection through a menu system of a user interface on a first computing device such as a desktop computer. In one implementation, this type of request ends any other current client-server sessions. In some implementations, the mobile server application running on the first computing device generates a barcode image (e.g., a two-dimensional matrix barcode image) on a display monitor connected to the first computing device. In an implementation, the matrix barcode image is a Quick Response Code (QR code) image.

The matrix barcode image is a machine-readable optical label that contains client-server connection information. Examples of the client-server connection information are a server Internet Protocol address (IP address) for the first computing device, a server hostname for the first computing device, a server listening port for the first computing device, and a server authentication code for the first computing device, which is periodically refreshed. In an implementation, some or all of the client-server connection is encrypted prior to being sent from the first computing device to remote computing device 600. In another implementation, some or all of the client-server connection information is manually entered by the user into a form on the screen of remote computing device 600. Each of these two options are shown on touch screen 210 of remote computing device 600.

When a matrix barcode image is used, in an implementation, the user scans the image on the display monitor of the first computing device with a camera of remote computing device 600. Remote computing device 600 decodes the scanned client-server connection information and initiates a session handshake with the mobile server application on the first computing device. In an implementation, remote computing device 600 sends the server authentication code, a mobile client application version number, and a platform used by remote computing device 600 such as an operating system version, an indication of the hardware used by remote computing device 600 and a MAC address of remote computing device 600. In an implementation, when the client-server communication session is successfully setup, the mobile client application on remote computing device 600 stores the client-server connection information and any security tokens for subsequent connections.

Figure 7:
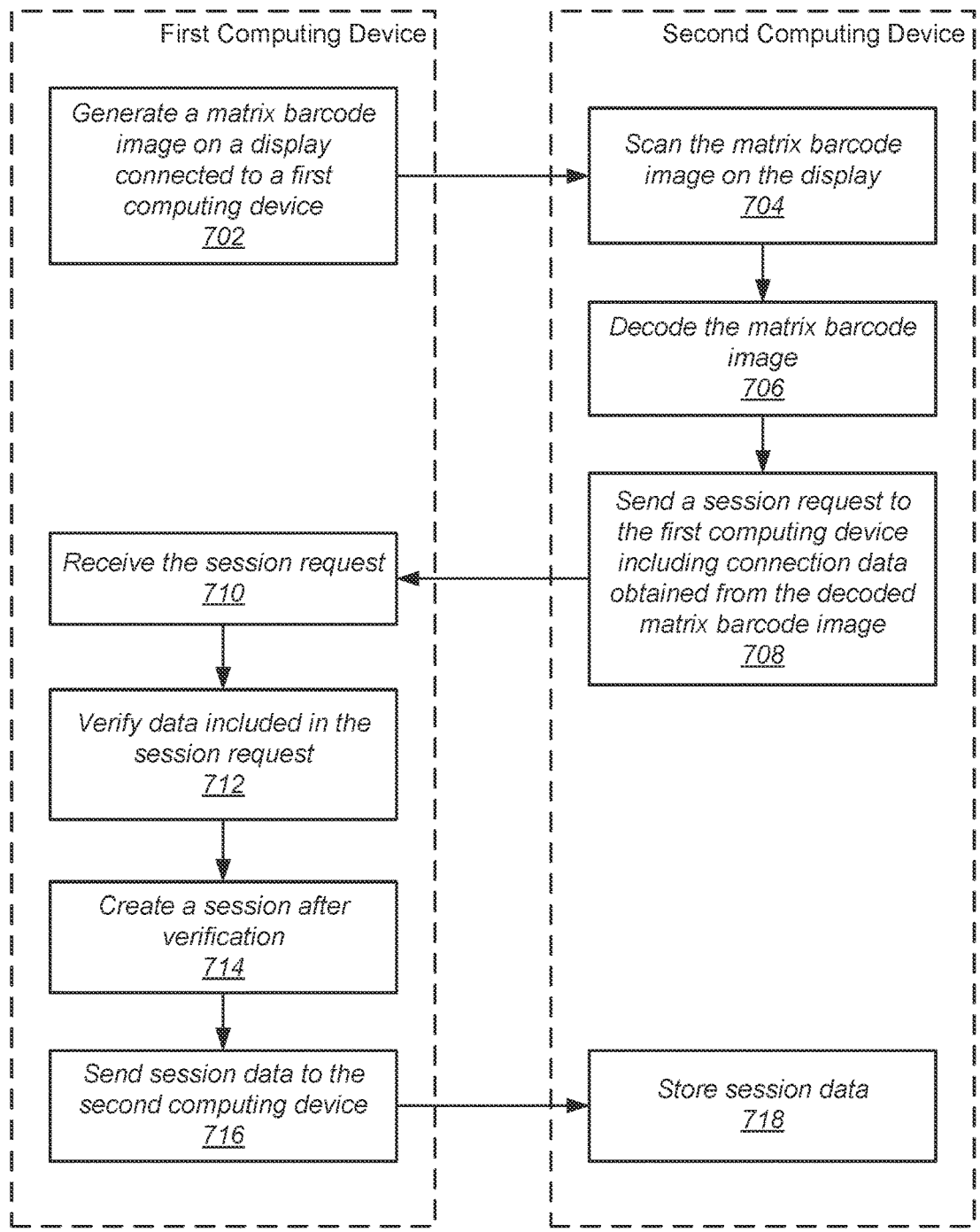
FIG. 7 is a flow diagram of one implementation of a method for setting up a connection between computing.

Referring now to FIG. 7, one implementation of a method 700 for setting up a connection between computing devices is shown. A matrix barcode image is generated on a display connected to a first computing device (block 702). The matrix barcode image on the display is scanned (block 704). The matrix barcode image is decoded (block 706). A session request is sent to the first computing device including connection data obtained from the decoded matrix barcode image (block 708).

The session request is received (block 710). The data included in the session request is verified (block 712). A session is created after verification (block 714). Session data is sent to the second computing device (block 716). The session data is stored for subsequent connections (block 718).

In various implementations, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes one or more memories and one or more processors for executing program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first computing device; and
   a communication interface;
   wherein the first computing device comprises circuitry configured to:
   send a session request to a second computing device external to the apparatus, via the communication interface, comprising connection data obtained from an image generated and displayed by the second computing device, wherein the image comprises at least one of a barcode or human readable client-connection information;
   receive, via the communication interface, session data different from the connection data from the second computing device;
   generate a first user interface on the first computing device, based at least in part on the second computing device executing a given application, wherein the first user interface indicates a state of one or more operational parameters of the second computing device; and
   send, via the communication interface, a user selected command that causes an adjustment to at least one of the one or more operational parameters of the second computing device.

2. The apparatus as recited in claim 1, wherein the at least one of the one or more operational parameters is at least one of a power and performance parameter.

3. The apparatus as recited in claim 1, wherein the first computing device is configured to send the command responsive to receiving diagnostic data from the second computing device.

4. The apparatus as recited in claim 3, wherein the at least one of the one or more operational parameters corresponds to at least one of a fan speed and a clock speed of the second computing device.

5. The apparatus as recited in claim 1, wherein the command corresponds to a video recorder command for a software application.

6. The apparatus as recited in claim 1, wherein the first computing device is configured to convey a session request to establish the session.

7. The apparatus as recited in claim 1, wherein the first computing device is configured to establish the session based at least in part on the image being captured by a camera of the first computing device.

8. The apparatus as recited in claim 1, wherein session data corresponding to the session comprises one or more of a server Internet Protocol address for the second computing device, a server hostname for the second computing device, a server listening port for the second computing device, and a server authentication code.

9. A method comprising:
sending a session request from a first computing device to a second computing device external to the first computing device, the session request comprising connection data obtained from an image generated and displayed by the second computing device, wherein the image comprises at least one of a barcode or human readable client-connection information;
receiving session data, different from the connection data, from the second computing device;
generating a first user interface on the first computing device, based at least in part on the second computing device executing a given application, wherein the first user interface indicates a state of one or more operational parameters of the second computing device; and
sending, from the first computing device, a user selected command that causes an adjustment to at least one of the one or more operational parameters of the second computing device.

10. The method as recited in claim 9, the at least one of the one or more operational parameters is at least one of a power and performance parameter.

11. The method as recited in claim 9, further comprising sending the command from the first computing device, responsive to receiving diagnostic data from the second computing device.

12. The method as recited in claim 11, wherein the at least one of the one or more operational parameters corresponds to at least one of a fan speed and a clock speed of the second computing device.

13. The method as recited in claim 9, wherein the command corresponds to a video recorder command for a software application.

14. The method as recited in claim 9, comprising conveying a session request to establish the session.

15. The method as recited in claim 9, further comprising establishing, by the first computing device, the session based at least in part on the image being captured by a camera of the first computing device.

16. The method as recited in claim 9, further comprising decoding the image to obtain data comprises one or more of a server Internet Protocol address for the second computing device, a server hostname for the second computing device, a server listening port for the second computing device, and a server authentication code.

17. A non-transitory computer readable storage medium storing program instructions, wherein the program instructions are executable by circuitry of a processor to:
send a session request from a first computing device to a second computing device, via a communication interface, comprising connection data obtained from an image generated and displayed by the second computing device, wherein the image comprises at least one of a barcode or human readable client-connection information;
receive at the first computing device, via the communication interface, session data different from the connection data from the second computing device;
generate a first user interface on the first computing device, based at least in part on the second computing device executing a given application, wherein the first user interface indicates a state of one or more operational parameters of the second computing device; and
send, via a communication interface, a user selected command that causes an adjustment to at least one of the one or more operational parameters of the second computing device.

18. The non-transitory computer readable storage medium storing program instruction as recited in claim 17, wherein the first computing device is configured to receive data from the second computing device used for establishing the session.

19. The non-transitory computer readable storage medium storing program instruction as recited in claim 17, wherein the program instructions are executable by a processor to send the command from the first computing device, responsive to receiving diagnostic data from the second computing device.

20. The non-transitory computer readable storage medium storing program instruction as recited in claim 17, wherein the program instructions are executable to obtain connection data from the image displayed by the second computing device.

* * * * *